Figures 1, 2:
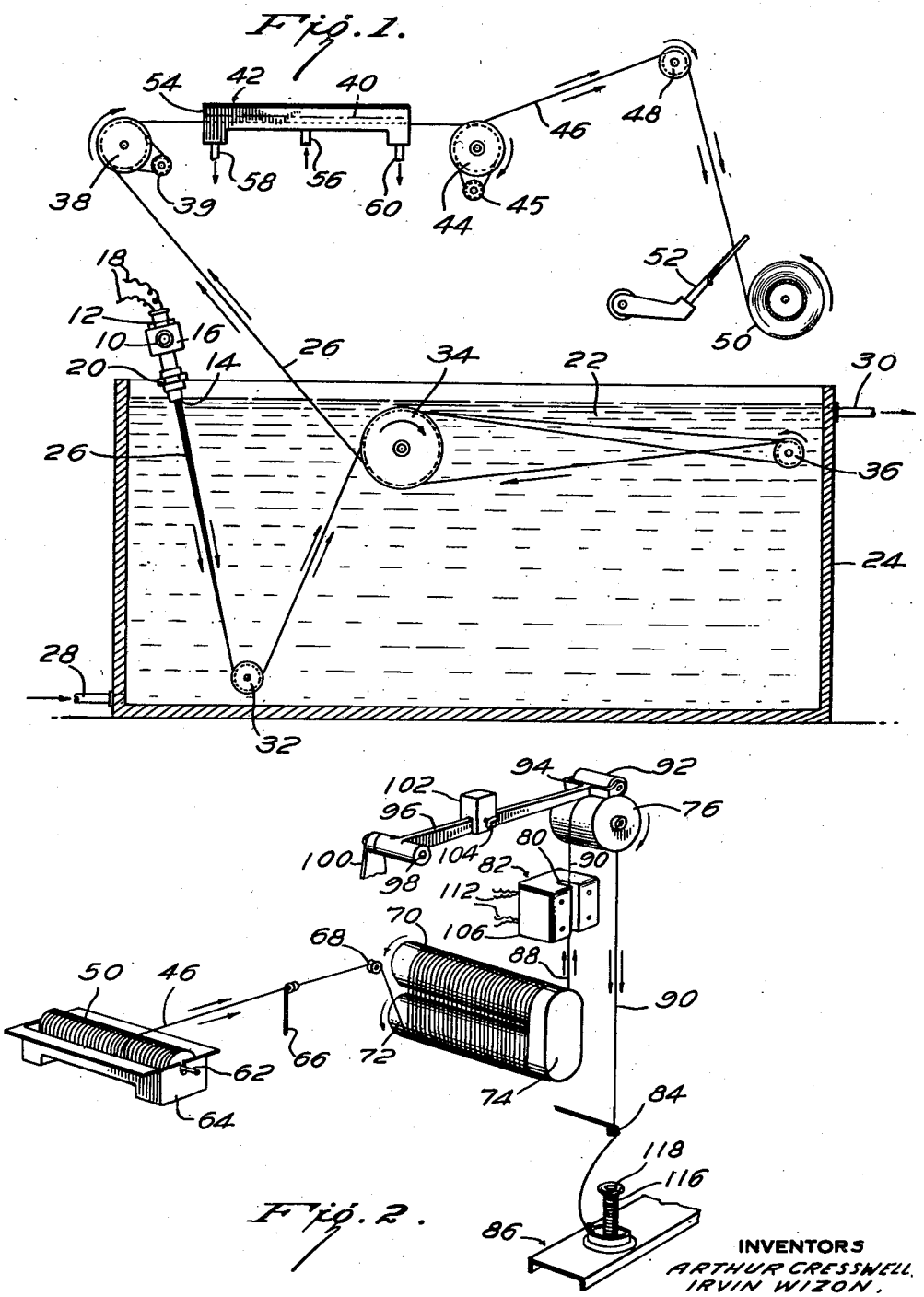

July 3, 1951

A. CRESSWELL ET AL 2,558,733

METHOD OF PRODUCING SYNTHETIC FIBERS FROM
POLYMERS AND COPOLYMERS OF ACRYLONITRILE

Filed June 8, 1949

2 Sheets-Sheet 1

INVENTORS
ARTHUR CRESSWELL
IRVIN WIZON
BY
Harold L. Kauffman
ATTORNEY

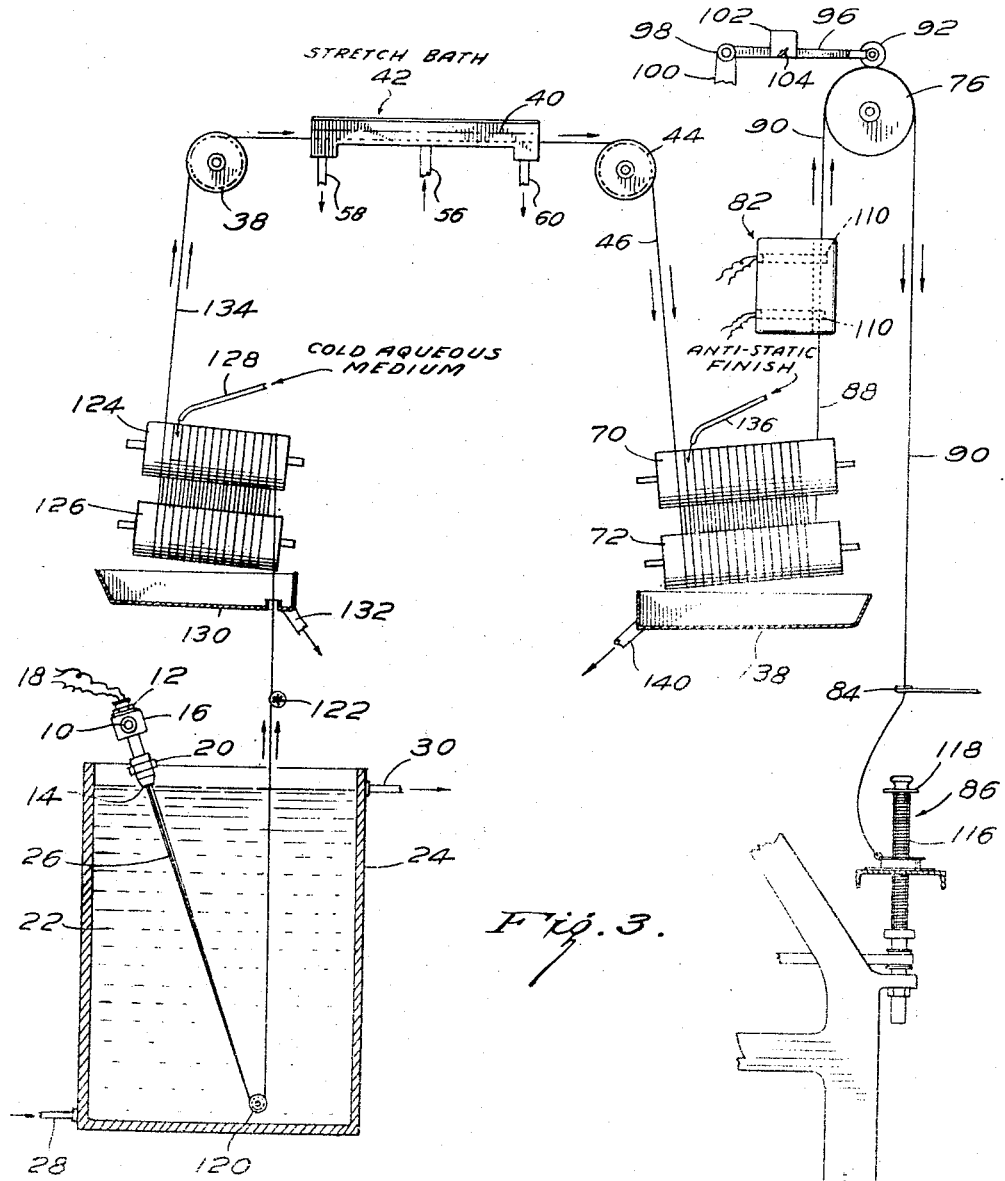
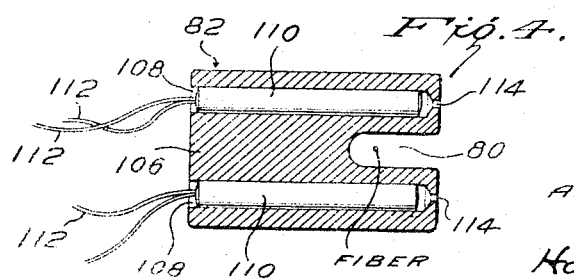

Patented July 3, 1951

2,558,733

UNITED STATES PATENT OFFICE

2,558,733

METHOD OF PRODUCING SYNTHETIC FIBERS FROM POLYMERS AND CO-POLYMERS OF ACRYLONITRILE

Arthur Cresswell, Stamford, and Irvin Wizon, Springdale, Conn., assignors to American Cyanamid Company, New York, N. Y., a corporation of Maine Application June 8, 1949, Serial No. 97,786

9 Claims. (Cl. 18—54)

This invention relates to the preparation of synthetic fibers from polymers and copolymers of acrylonitrile. More particularly it is concerned with certain new and useful improvements in a method of producing fibers (including both monofilaments and multifilaments) from a soluble acrylonitrile polymerization product containing in the molecules thereof an average of at least about 85% by weight of acrylonitrile (combined acrylonitrile). The invention is especially concerned with the production of fibers having improved physical properties, e. g., increased elongation and resistance to shrinkage, from such polymerization products.

Various methods of producing filaments, films and other shaped articles from acrylonitrile (polymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metallic) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The invention disclosed and claimed in the copending application of one of us (Arthur Cresswell), Serial No. 772,200 filed September 4, 1947, is based on the discovery that useful films, filaments, threads and other shaped articles, which are capable of being dyed, can be produced from acrylonitrile polymerization products of the kind described therein and in the aforementioned patents, as well as hereinafter, by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below +10° C., e. g., within the range of —15° C. to +10° C. and preferably at from about —15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The invention disclosed and claimed in the aforementioned Cresswell copending application Serial No. 772,200 is based on the further discovery that the shaped, precipitated gels, e. g., extruded, water-swollen monofilaments and multifilaments, which may be collectively designated as yarns or fibers, and which have been formed in a cold liquid coagulant comprising water at a low temperature of the order of that mentioned in the preceding paragraph, can be materially improved in properties by subjecting the precipitated material in wet, swollen state to tension, as by stretching, in contact with moisture or water and at an elevated temperature, specifically at a temperature within the range of about 70° C. to 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam can be employed. For optimum results during stretching it is important that moisture or water be present. By thus wet stretching the precipitated product, more particularly to an extent at least twice its original length (that is, at least 100%) and preferably from 3 to 15 or 20 or more times its original length, the molecules are oriented along the fiber axis and a product having increased tensile strength, pronounced fibrillation, toughness, resilience and other improved properties is obtained.

The invention disclosed and originally claimed in Cresswell's copending application Serial No. 68,370, filed December 30, 1948, now abandoned in favor of my copending application Serial No. 73,078, filed January 27, 1949, and wherein the claims first made in said application Serial No. 68,370 now appear, is concerned with certain new and useful improvements in the process of producing yarns or fibers from polymers and copolymers of acrylonitrile as disclosed and claimed in the aforementioned copending application Serial No. 772,200 and more particularly to an improved process whereby the stretched, water-swollen or aquagel fiber of the acrylonitrile polymerization product can be continuously dried, or preferably, both continuously spun, stretched and dried whereby a fiber or thread is obtained more quickly and with a minimum of handling so that the product is more uniform and is less subject to damage during processing than, for example, a package-spun fiber or thread.

The invention disclosed in Cresswell's copending application Serial No. 73,078, filed January 27, 1949, involves a new and novel improvement, which was disclosed but not claimed in the aforementioned copending application Serial No. 68,370, and which consists in the step of stretching the gelled fiber of acrylonitrile polymerization product in the presence of moisture at a temperature within the range of about 70° C. to about 100° C. and, also, while it is in a line which is tangent to two rotating circular surfaces and between which there is no other point of solid, frictional contact, the peripheral speed of one of the said rotating surfaces being greater than that of the other thereby to maintain the gelled fiber under tension. This step can be used in the process of the present invention. Among the advantages of this particular step in the production of a synthetic fiber from a water-coagulable solution of an acrylonitrile polymerization product may be mentioned the following:

The thread, during its stretching operation, may be subject to mechanical damage, i. e., filament breakage, abrasion, etc., as it comes in frictional contact with such devices as hooks, rollers or sheaves, which conventionally are used to submerge a thread in a bath. In accordance with the invention disclosed in Cresswell's application Serial No. 73,078 such defects are obviated by using apparatus in carrying out the process which is so designed that there is no frictional contact on the thread during the critical stretching operation whereby the gelled fiber is oriented along the fiber axis.

Another novel feature of the invention disclosed in Cresswell's aforementioned copending application Serial No. 73,078 involves the step of applying to the gelled fiber (that is, after coagulation of the solution containing the polymeric or copolymeric acrylonitrile in a bath of a cold liquid coagulant comprising water) a cold liquid treating agent comprising water while the said gelled fiber is moving in a helical path. This step also can be used in the process of the present invention. The liquid treating agent likewise should be at a temperature not exceeding +10° C., for example at a temperature within the range of −15° C. to +10° C., and preferably at a temperature of about 0° C. to about +5° C. This cold liquid treating agent, which is preferably composed of water at a low temperature such as has been mentioned before, is advantageously applied to the gelled fiber while the fiber is moving in a helical path in contact with a smooth rotating surface which likewise is at a temperature not exceeding +10° C. The rotating surface may take the form of a pair of cylindrical rolls upon which helices of the gelled fiber advance from the feed-on end to the take-off end. These rolls advantageously may be tilted at a suitable angle, for instance, at an angle of about 2° to about 10°, e. g., about 5°, and the liquid treating agent applied at the take-off end of one or both of the rolls whereby the fiber is countercurrently treated or washed with the treating or washing agent. By the application of, for example, cold water to advancing helices of the gelled fiber, any traces of water-soluble impurities which may be present in the fiber or on its exterior surfaces, such, for example, as traces of salts, solutions of which may have been used in dissolving the acrylonitrile polymerization product, will be removed from the gelled fiber prior to the stretching operation. The removal of traces of such water-soluble impurities is advantageous in that it permits optimum stretching of the gelled fiber with resulting improvement in the properties of the final product.

The final step of the process disclosed in Cresswell's application Serial No. 73,078 comprises drying the stretched fiber. This can be done by conventional methods such as by drying at room temperature on a bobbin or other device on which the gelled fiber may have been collected; or drying can be effected continuously by the use of heated, convergent rolls.

The present invention likewise is concerned with certain new and useful improvements in a process of producing yarns or fibers from acrylonitrile polymerization products, specifically such products containing in the molecules thereof an average of at least about 85% by weight of combined acrylonitrile, and more particularly to a method of producing therefrom synthetic fibers having increased elongation, increased resistance to shrinkage (usually from zero to not more than about 2 or 3% linear shrinkage after immersion for 10 minutes in boiling water), as well as other improvements in properties.

The dried, oriented fibers or yarns produced by the methods disclosed and claimed in the aforementioned Cresswell copending applications, viz., Serial Nos. 772,200, 68,370 and 73,078, generally have good wet and dry tenacities (e. g., at least 3 grams per denier, more particularly from 3.5 to 4 or even as high as 4.5 or more grams per denier), but have relatively high shrinkage when immersed in very hot or boiling water or in a high temperature or boiling aqueous dye bath. Furthermore, their elongation (that is, the per cent to which they can be extended under stress before breaking) is usually of the order of 7 to 13%, which is inadequate elongation (especially at the lower percentage values) for many applications of the fiber. For instance, in textile operations such as twisting, weaving, knitting, etc., it is generally desirable that the fiber or yarn have an elongation of from 15-18% to 22-25%.

Our invention is a solution to the problem of economically and rapidly improving the elongation and resistance to shrinkage of synthetic fibers produced from acrylonitrile polymerization products by the methods disclosed in the aforementioned Cresswell copending applications. The products of the present invention are either completely non-shrinking or have a low order of shrinkage when immersed in boiling water for 10 minutes; in addition, they have improved, specifically increased, elongation characteristics which render them eminently suitable for use in weaving, knitting and other textile operations. Because of their zero or low percentage of shrinkage, very hot or boiling aqueous dye baths can be used effectively in dyeing the fiber or fabrics made therefrom; that is, the fibers or fabrics can be dyed at the high temperatures commonly used in dyeing other textiles without shrinking or otherwise adversely affecting the properties of the products of our improved method. Furthermore, fabrics made from our fibers having from 0 to 1 or 2% shrinkage can be laundered satisfactorily without any particular limitation upon the temperature of the wash water. Another advantage of our invention resides in the fact that the aforementioned improvements in properties are obtained without excessively or materially decreasing, if at all, the dry and/or wet tenacity values of the dried, oriented fiber.

The present invention is based on our discovery that gelled, stretched, continuously dried fibers produced from a soluble acrylonitrile polymerization product containing in the molecules thereof an average of at least about 85% by weight of combined acrylonitrile (as disclosed in the aforementioned copending Cresswell applications) are, surprisingly, amenable to a rapid, continuous heat treatment whereby the properties of the fiber or yarn are materially improved. More particularly we have found that the aforementioned improvements in properties can be obtained rapidly and inexpensively by continuously passing the dried fiber (immediately after it has been continuously dried and, more particularly, while moving under tension in a helical path) through a heated zone, e. g., a zone of hot air, hot flue gases, hot nitrogen, or other medium, specifically a gaseous medium, in which the fiber is inert, under certain particular conditions of time and temperature and while the fiber is relaxed and free to contract linearly. The zone through which the relaxed fiber is continuously passed should be maintained at a temperature within the range of 100° C. (about 100° C.) to 500° C. (about 500° C.), preferably within the range of about 175° C. to about 400° C. The relaxed, free-to-shrink (free-to-contract) fiber should be passed through the aforementioned heated zone at a rate such that the time at which any given point on the said fiber is within the said zone is from 0.01 (about 0.01) to 5 (about 5) seconds, preferably from 0.01 to 1 second. The temperature of the hot zone and the rate at which the dried, relaxed fiber is passed therethrough are such that no substantial decomposition of the fiber occurs.

From the foregoing description it will be seen that the present invention provides a method of producing a synthetic fiber, more particularly a synthetic fiber having improved physical properties, from a soluble acrylonitrile polymerization product containing in the molecules thereof an average of at least about 85% by weight of combined acrylonitrile, which method comprises first extruding the said product in the form of a fiber from a water-coaguable solution thereof, more particularly from a solution of the acrylonitrile polymerization product in a concentrated aqueous solution of a water-soluble salt, specifically a water-soluble metallic salt, which yields highly hydrated ions in aqueous solution, e. g., calcium thiocyanate or other water-soluble thiocyanate. Immediately after extrusion the extruded mass is contacted with a liquid coagulant comprising water, which coagulant is at a temperature not exceeding +10° C., thereby to precipitate the said product from the said solution as a stretchable, gelled fiber. After stretching the gelled fiber in the presence of moisture and at a temperature within the range of about 70° C. to about 110° C., a liquid composition containing an anti-static agent is applied to the stretched or oriented gelled fiber. The resulting gelled fiber is then continuously dried while it is moving under tension in a helical path and thereafter is continuously heated, while relaxed and free to contract linearly, under time and temperature conditions such as have been mentioned hereinbefore.

We are aware of the fact that it was known prior to our invention that the physical properties of an oriented shaped article, for example an oriented yarn, formed from a polymer containing a major proportion of acrylonitrile could be improved by first heating the shaped article in a relaxed, free-to-shrink condition at a temperature of 80° C. to 300° C. and then maintaining the shrunken, shaped article for a period of at least 1 hour at 80°–300° C. under a tension insufficient to stretch the said shrunken article, both of these heating steps being carried out in the presence of an inert heating medium. This process has the disadvantage that it is very time-consuming, since periods of over an hour are required to effect the result, and therefore it does not lend itself readily to continuous operations. Furthermore, the process is costly due to the long heating period which is required.

Surprisingly, we have found that fibers of an acrylonitrile polymerization product which have been spun, stretched and dried as described in the aforementioned Cresswell copending applications can be heat treated, while relaxed and free to contract linearly, for an extremely brief period of time, more particularly for a period of the order of 0.01–0.1 to 1–5 seconds, at 100°–500° C. and thereby obtain shrink-resistant fibers having increased percentage elongation, e. g., from 1.2 to 2.5 times (or more), that of the same dried, oriented fiber prior to the after-heat treatment. This was quite unobvious and unpredictable since ordinarily it would be expected that dried, oriented fibers having essentially the same chemical composition would require the same conditions of heat treatment in order to obtain corresponding improvements in properties. The reason why we are able to obtain the marked improvement in properties by such a brief or shock heat treatment is not clearly understood, but probably it is due to the differences in the physical structure of the dried, oriented fibers of acrylonitrile polymerization product which are subjected to heat treatment in a relaxed state, that is to say, between the dried, oriented fibers resulting from the methods disclosed and claimed in the aforementioned Cresswell copending applications and those produced by other methods known to the art.

The novel features which are characteristic of our invention are set forth in the appended claims. The invention itself, however, will best be understood by reference to the following more detailed description when considered in connection with the accompanying drawing in which Fig. 1 is a diagrammatic side view of one portion and Fig. 2 is a diagrammatic view, shown in perspective, of another portion of apparatus that can be used in practicing the present invention, and illustrative thereof; Fig. 3 is a diagrammatic side view of another and preferred form of apparatus that can be employed in carrying our invention into effect; and Fig. 4 is a transverse, elevational view of a portion of the apparatus shown in Figs. 2 and 3.

Polymeric acrylonitrile and acrylonitrile copolymers containing in the molecules thereof an average of at least about 85% by weight of combined acrylonitrile are used in practicing the present invention. These acrylonitrile polymerization products are prepared by methods well known to those skilled in the art. In some cases the polymerization rates of the individual monomers in a polymerizable mixture may be different, with the result that the proportions of the components in the final copolymer are different from the proportions thereof in the mixture of monomers which is polymerized. In the copolymeric products which are used in practicing the present invention, the proportions of monomers in the copolymerizable mixture from which the copolymers are made preferably are adjusted so that the final copolymer contains in the molecules thereof an average of at least about 85% by weight of combined acrylonitrile. The expression, "polymerization product containing in the molecules thereof an average of at least about 85% by weight of combined acrylonitrile", as used herein and in the appended claims, means a polymerization product (polymer, copolymer or interpolymer or mixture thereof) containing in its molecules an average of at least about 85% by weight of the acrylonitrile unit, which is considered to be present in the individual polymer molecule as the group

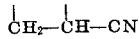

or, otherwise stated, at least about 85% by weight of the reactant substance converted into and forming the polymerization product is acrylonitrile (combined acrylonitrile).

Illustrative examples of monomers which can be copolymerized or interpolymerized with acrylonitrile to yield a polymerization product (copolymer or interpolymer) containing in the polymer molecules an average of at least about 85% by weight of acrylonitrile are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides and fluorides; allyl-type alcohols, e. g., allyl alcohol, methallyl alcohol and other unsaturated monohydric alcohols; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also can be copolymerized with acrylonitrile to form copolymers which can be used in practicing the present invention. Examples of such esters are the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least about 85% by weight of acrylonitrile. Thus, when the polymerization rate of the monomers present in the polymerizable mixture is substantially the same, the proportions can be, for example, from, by weight, about 85% to about 99% of acrylonitrile to from about 15% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50 or 60% by weight thereof in order to obtain a polymerization product containing in the copolymer molecules an average of at least about 85% by weight of combined acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Strain Patent No. 2,135,443 and Bauer et al. Patent No. 2,160,054. The polymeric and copolymeric acrylonitriles which are used in practicing the present invention may be of any suitable molecular weight, but ordinarily the molecular weight (average molecular weight) is within the range of 15,000 to 300,000 (more particularly from 35,000 to 300,000) or higher, and advantageously is within the range of about 50,000 to about 150,000, as calculated from viscosity measurements using the Staudinger equation (reference: U. S. Patent No. 2,404,713).

The polymeric or copolymeric acrylonitrile is then dissolved in a solvent from which the polymer (or copolymer) is precipitated or coagulated when the solution is brought into contact (e. g., immediately after extrusion) with a liquid coagulant comprising water, more particularly water which is at a temperature not exceeding substantially $+10°$ C., preferably at or below $+5°$ C., e. g., at from $-10°$ C. to $+5°$ C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921 and the concentrated aqueous solutions of which are the preferred solvents for the acrylonitrile polymerization product, more particularly such a product containing in the molecules thereof an average of at least about 85% by weight of combined acrylonitrile, in carrying the present invention into effect. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in Cresswell's copending application Serial No. 772,201, filed September 4, 1947, now Patent No. 2,533,224, issued December 12, 1950.

With reference to the accompanying drawing and more particularly to Fig. 1 thereof, a water-coagulable solution of the polymeric or copolymeric acrylonitrile, which has been filtered (if necessary) and de-aerated, is passed under pressure from a supply reservoir (not shown) through the conduit 10 into a spinneret coupling or heading 12, which preferably is designed so that the solution can be heated, e. g., by electrical, hot water, steam or other means, prior to extrusion through the spinneret 14. A suitable design of a spinneret coupling, which is heated by electrical means, is shown in Fig. 2 of the drawing accompanying Cresswell's aforementioned copending application Serial No. 772,200. The device there illustrated, and portions of which will be described herein with reference to Fig. 1 of the present drawing, comprises a male coupling 16 in which is annularly spaced an electrically heated cartridge provided with lead-in wires 18. This cartridge advantageously may be fitted in the male coupling 16 by means of a liquid-tight plug. The electrically heated cartridge is so positioned as to project beyond the lower end of the male coupling 16 and into the cup of the spinneret 14, which is attached by means of female coupling 20. The solution being charged through conduit 10 passes annularly between the outer wall of the cartridge and the inner wall of the male coupling 16 and thence into the spinnert 14. Since the electrically heated cartridge projects into the cup of the spinneret, the solution is maintained at an elevated temperature prior to extrusion. The temperature of the solution may be varied as desired or as conditions may require, but ordinarily will be within the range of 60° C. to 100° C. By heating the solution immediately prior to extrusion, its viscosity is materially reduced and a substantial reduction in operating pressure is effected. Furthermore, by increasing the fluidity of the solution at the point of extrusion, the water-swollen or gelled filaments can be pulled from the spinneret at a greater speed, thereby increasing the amount of fiber or yarn that can be produced from a particular unit.

The spinneret coupling 12 may be held by suitable means (not shown) above the cold aqueous coagulating or precipitating bath 22 in vessel 24 at any convenient angle. For example, the spinneret coupling may be positioned at less than a 90° angle to the surface of the aqueous coagulating bath 22 as shown in Fig. 1 of the drawing accompanying the present application or at approximately a 90° angle to the surface of the said bath as shown in Fig. 1 of the drawing of Cresswell's aforementioned copending application Serial No. 772,200. The coupling preferably is positioned so that only the face of the spinneret contacts the coagulating bath.

As the solution is forced under pressure through the openings in the spinneret, it coagulates or precipitates in the form of solid, water-swollen or gelled filaments or fiber 26 upon entering the coagulating bath 22, which is maintained at a temperature not exceeding substantially +10° C. by any suitable means. For example, water may be refrigerated or cooled to the desired low temperature and circulated through the vessel 24, being introduced through the conduit 28 and withdrawn through the conduit 30. Alternatively, and as shown in Fig. 1 of the drawing accompanying Cresswell's aforementioned copending application Serial No. 772,200 cooling coils through which is circulated a liquid coolant, e. g., a refrigerated brine solution, may be employed to maintain the bath 22 at the desired low temperature. It will be understood, of course, that various other means may be used to keep the bath 22 at or below +10° C. For instance, instead of employing means such as mentioned above, we may add ice alone to the bath, or a mixture of ice and sodium chloride or other salt, or ice and methyl or ethyl alcohol, or other suitable temperature depressants or mixtures thereof in order to reduce the bath of liquid coagulant comprising mainly water to the desired low temperature.

The coagulated fiber in the gel state is led through the bath 22, which preferably is of the circulating type, by any suitable means.

The gelled fiber may be led through the bath 22 merely with the aid of a guide roll or sheave 32 to facilitate the passage of the fiber through the coagulating bath, as is shown in Fig. 1 of the drawing accompanying Cresswell's aforementioned copending application Serial No. 772,200. Advantageously, however, the gelled fiber is led through the bath 22 with the aid of a submerged, power-driven godet 34 and multi-groove roll 36. For instance, the gelled fiber may be led through the bath 22 and out of it, as is shown in Fig. 1 with the aid of guide roll 32, power-driven godet 34 and multi-groove roll 36. The gelled fiber is wrapped several times between the godet 34 and the multi-groove roll 36. This arrangement permits a long bath travel by multiple winds of synthetic fiber, without causing excessive tension on the fiber, such as may occur when a pair of multi-groove rollers alone is used in leading the fiber through the bath.

It is important that the coagulating bath 22 be at a temperature not exceeding substantially +10° C., and preferably at or below +5° C., e. g., −10° C. to 0° C. or +1° or +2° C. Temperatures below −15° C., e. g., −20° C. or lower, may be employed if desired, but such temperatures are more costly to secure and maintain, and no particular advantages appear to accrue therefrom. By the use of a low-temperature, aqueous coagulating bath as herein described, the shaped, coagulated or precipitated material, more particularly an extruded, water-swollen or gelled fiber or thread, is clear (transparent) or substantially clear, cohesive, has considerable elasticity and toughness, and is capable of being oriented, e. g., by stretching. In marked contrast, when the aqueous coagulating bath is substantially above +10° C., e. g., +20° C. or +25° C. or higher, the resulting fiber or thread usually either is opaque or shows considerable haze, is spongy and has little or no mechanical strength. Furthermore, it is either unstretchable or has a low order of stretchability, yielding on drying a brittle fiber or thread which cannot be used for textile purposes.

Furthermore, when multifilaments are produced with the aid of a low-temperature coagulating bath as herein described, the individual water-swollen or gelled filaments show no tendency to stick together. This was quite surprising and unexpected, as was also the fact that the swollen or gelled products could be washed substantially free of salt without difficulty, even in a cold coagulating bath, especially in view of the fact that these discoveries are directly contrary to the prior art teachings. For example, in Patent No. 2,404,716 and in numerous other patents it is stated that it has been found substantially impossible to use the solutions proposed in Rein Patent No. 2,140,921 in the production of yarns and films, and that their extrusion into coagulating baths, including such non-solvents for polyacrylonitrile as water, dilute acid solutions, dilute salt solutions, etc., results in the formation of shaped articles that contain large amounts of the inorganic salt component of the solvent. The prior art also teaches that these salts are distributed throughout the structure, that the latter possesses poor physical properties and that the removal of these salts, when possible, results in the formation of a porous, spongy, weak, undesirable structure that is very brittle and completely unsuited for use as a yarn or film. The prior art further teaches that when an attempt is made to form a multifilament yarn by extruding an aqueous sodium sulfocyanide (sodium thiocyanate) polyacrylonitrile composition into a dilute acid bath, the individual filaments that are obtained stick together to form an essentially monofilament structure which is extremely brittle and cannot be bent or worked without breaking. In marked contrast the synthetic fibers obtained by practicing the present invention are substantially free from salts, are tough and ductile even when first coagulated in the spinning or precipitating bath, and the individual filaments show no tendency to stick together when extruded through a spinnaret into the cold aqueous bath.

In carrying the present invention into effect the spun fibers are treated after leaving the coagulating bath in order to orient the molecules and thereby to increase the tensile strength and otherwise to improve the properties of the spun material. Orientation is preferably effected by stretching the fiber, while still in its water-swollen or gel state, in the presence of moisture and at a temperature within the range of about 70° C. to about 110° C., more particularly at a temperature of about 90° C. to about 100° C. This stretching may be effected, for example, in the manner illustrated in Fig. 1 of Cresswell's aforementioned copending application Serial No. 772,200 or, preferably, as illustrated in Figs. 1 and 3 of the drawing accompanying the instant application.

With reference to Fig. 1 of the drawing of the present application, the fiber 26 after leaving the aqueous coagulating bath 22 passes over the revolving wheel or godet 38 and the auxiliary roller 39, being wrapped one or more (e. g., two or three) times about each, into the hot aqueous liquid medium 40, e. g., hot water, contained in the stretch trough 42, and thence over the godet 44 and the auxiliary roller 45, about each of which the fiber also is wrapped one or more (e. g., two or three) times. The peripheral speed of the godet 38 may be slightly greater than that of the godet 34. The godet 44 is caused to revolve at a peripheral speed greater than that of the godet 38; in other words, the surface speed of the godet 44 is such that the ratio of speeds of godets 38 and 44 is proportional to the desired stretch which is to be applied to the fiber as it passes through the hot aqueous liquid medium 40. After leaving the godet 44 the stretched or oriented, gelled fiber 46 passes over the guide roll or sheave 48 and then is collected on a take-up spoon or bobbin 50 with the aid of the traverse guide 52. A small amount of water or other liquid medium adapted to maintain the stretched fiber in a gel state may be applied by any suitable means to the fiber as it is being collected on the bobbin 50. For instance, the revolving bobbin may be continuously sprayed with water as the fiber is being collected thereon. Instead of being wound upon a spool or bobbin the stretched fiber may be collected, for example, in a centrifugal pot whereby twist is advantageously applied to the wet fiber.

The amount of stretch that is applied to the water-swollen or gelled fiber may be varied widely, but in all cases be sufficient to cause at least appreciable orientation of the molecules and an improvement in the properties of the fiber undergoing treatment. The amount of tension to which the fiber is subjected obviously should not be so great as to cause the fiber to break. Depending, for example, upon the type of material being stretched or elongated and the particular properties desired in the finished product, the amount of stretch may vary, for instance, from 100%, preferably from 200 or 300%, up to 2000% or more of the original length of the fiber.

The stretch trough 42 illustrates one suitable form of apparatus which may be used in the stretching operation. More detailed views of this trough are shown in Figs. 5, 6 and 7 of the drawing accompanying Cresswell's aforementioned copending application Serial No. 68,370, and, also, in application Serial No. 146,880, filed February 28, 1950 as a division of said Serial No. 68,370, the stretch trough there described and illustrated being broadly and specifically claimed in said divisional application. This trough is positioned between the godets 38 and 44 so that the fiber 26, which is tangent to the tops of the godets, is slightly above (e. g., about 1/8 inch above) the bottom of a V-shaped trough portion as it passes through the hot aqueous liquid medium contained in the trough 42. The fiber 26 enters the stretch trough 42 slightly above the bottom portion of the U-shaped slot in end wall 54 of the trough. The hot aqueous liquid medium in which the fiber is stretched is preferably circulated through the trough 42, entering the trough through the conduit 56 and leaving through the conduits 58 and 60. As is shown in Figs. 5, 6 and 7 of Cresswell's application Serial No. 68,370, the V-shaped trough portion is provided with a series of openings in the bottom of the trough and in each of the sides forming the V. The hot aqueous liquid medium 40 entering the stretch trough 42 through the conduit 56 is forced through the aforementioned openings, thereby mildly agitating the hot aqueous liquid in the trough. The liquid medium 40 flows along the V-shaped trough portion into collecting reservoirs located at each end of the stretch trough 42, from which reservoirs it then passes through the conduits 58 and 60 to a supply reservoir (not shown).

The hot aqueous liquid medium 40 which is circulated through the trough 42 may be heated by any suitable means (not shown) to the desired temperature. For example, the water or other aqueous liquid medium employed may be heated electrically, or by gas, steam or other means, in a suitable heating unit having a supply reservoir and connecting conduits to and from the stretch trough 42 for circulation of the hot aqueous liquid medium between the supply reservoir and the stretch trough. To conserve heat and in order better to maintain the temperature of the aqueous liquid in the stretch trough, it is usually desirable to insulate the trough with suitable heat-insulation, e. g., glass fibers, asbestos, cork, etc., in board, sheet, tape or other form in which these materials are available for use as heat insulation. A suitable cover (not shown), which may be hinged or which merely may fit loosely over the top of the trough and is removable therefrom, also advantageously may be provided in order to reduce heat losses and to provide a better control of the temperature of the hot aqueous liquid in the stretch trough. Such a cover likewise is preferably insulated with a suitable insulating material such as one or another of those mentioned above by way of illustration. The cover is raised or removed (if detachable from the trough) when "threading-up" the apparatus, and is closed or put back into place after the thread has been positioned in the stretch trough.

Among the advantages of using a stretch trough of the kind described above may be mentioned the following:

The thread, during the stretching operation, may be subject to mechanical damage, i. e., filament breakage, abrasion, etc., if it comes in frictional contact with such devices as hooks, rollers or sheaves, which conventionally are used to submerge a thread in a bath. The above-described device avoids this defect by having no frictional contact on the thread during this critical operation. Another advantage accrues by reason of the slight lift imparted to the thread by the multitude of small jets of water under the thread, thereby preventing any possible sag and contact of the thread with the bottom of the trough.

With reference to Fig. 2 of the drawing, the stretched, gelled fiber 46 on the bobbin 50 is then treated with a liquid composition, more particularly an aqueous dispersion, containing an anti-static agent by placing the bobbin supported on a trunnion 62 in the vessel 64 containing the anti-static treating or finishing composition. The helices of gelled fiber on the bobbin are treated throughout their length with the liquid anti-static composition as the bobbin rotates while withdrawing the gelled fiber from the bobbin as indicated in Fig. 2. Any suitable anti-static agent may be employed. Examples of anti-static agents which can be used are the guanylurea and guanidine salts of mono-aliphatic hydrocarbon esters of sulfuric acid, more particularly such salts wherein the aliphatic hydrocarbon grouping contains from 12 to 18 carbon atoms, inclusive, e. g., guanylurea octadecyl hydrogen sulfate, guanidine octadecyl hydrogen sulfate, guanidine oleyl hydrogen sulfate, etc. Other examples of such guanylurea and guanidine salts which can be used as anti-static agents in practicing the present invention are given in Cresswell's co-pending applications Serial No. 68,371 and Serial No. 68,372 filed December 30, 1948. Still other examples of anti-static agents which may be used are $\beta$-alkoxyproprionitriles, e. g., octadecoxypropionitrile; reaction products of ethylene oxide and a long-chain alkyl guanamine, e. g., octadecyl guanamine; and reaction products of ethylene oxide and a long-chain alkyl guanidine, e. g., octadecyl guanidine.

It is not essential that the liquid treating composition, e. g., an aqueous dispersion, which is applied to the stretched, gelled fiber 46 contain only an anti-static agent as the sole effect agent which is present in the composition. In some cases, however, it may be desirable or advantageous to use an anti-static agent alone as the sole effect agent, more particularly such agents which are inherently capable of functioning both as a lubricating agent and as an anti-static agent. In other cases it may be desirable to use the anti-static agent in conjunction with other conditioning or effect agents which are commonly employed in treating synthetic fibers, more particularly fibers produced from acrylonitrile polymerization products. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in conjunction with the aforementioned guanylurea salt or guanidine salt or other anti-static agent are wetting and dispersing agents and textile lubricants of various kinds, for instance N-octadecyl disodium sulfosuccinamate, dioctyl sodium sulfosuccinate, lecithin, esters of long-chain fatty acids, e. g., alkyl stearates, palmitates and oleates, more particularly the ethyl, propyl, butyl and amyl stearates, palmitates and oleates.

The liquid finishing composition in the vessel 64 may be at any suitable temperature, e. g., at from about 40° C. to about 70° C.

After being treated with the liquid finishing composition containing the anti-static agent, the treated, stretched fiber in gel state is led continuously with the aid of the thread guide 66, over the guide roll 68 and thence to the take-up or feed-on end of the drying rolls 70, 72. The fiber or yarn is under tension as it is led to these rolls and, also, as it advances in a helical path over the surfaces of the rolls to the delivery or take-off end.

The drying unit shown by way of example in Fig. 2 comprises two positively driven drums or rolls 70 and 72, suitably spaced from each other, e. g., 6 or 8 inches or more, suspended in the same plane, and rotating at the same peripheral speed. The rolls are slightly inclined (i. e., converge) toward each other at the delivery end thereby to advance the thread over the rolls. The degree of convergency may be varied as desired or as conditions may require in order to advance the thread in a plurality of helices over the rolls. Either one or both rolls may converge slightly toward each other at the delivery end. With rolls 4 inches in diameter and 10 inches long, satisfactory results have been obtained by having the lower roll convergent to the upper roll at the delivery end, by an angle of about 0.6°. If desired, both rolls may be tilted at a suitable angle to the horizontal, e. g., at an angle of approximately 5° to the horizontal.

Either or both of the rolls 70 and 72 may be heated by any suitable means. For example, the rolls may be heated and the advancing thread dried by blowing a blast of hot air or other hot gas over the surfaces of either or both rolls. Preferably, however, either or both rolls are hollow and are internally heated so as to provide a surface temperature on the exterior of the rolls within the range of about 40° C. to about 200° C., more particularly within the range of about 50° or 60° C. to 100° or 120° C. Thus the hollow rolls or drums may be internally heated electrically, or by steam, hot air or other gas, hot water or by any other suitable means. A simple method of internally heating either or both rolls is by radiation from electrical strip heaters positioned within the rolls, which heaters are mounted by clamping onto a support bar. The electrical connections for the heaters may be attached through the oval-shaped hollow plate 74. Preferably both rolls are internally heated.

From the foregoing description it will be seen that the advancing helices of the treated gelled fiber are dried continuously, and that a portion of each helix is in contact with a heated surface, advantageously a smooth, heated surface so that the possibility of damage to the fiber as it advances over the rolls will be minimized. The temperature of this surface, the portion of each helix which is in contact therewith, the duration of said contact and the number of helices in contact with the heated surface are such that the helices of gelled fiber are dried. Because of the application of the anti-static agent to the gelled fiber prior to its passage over the heated rolls, there is no accumulation of an electrostatic charge on the fibers during their passage over the rolls and, therefore, no difficulty in the continuous drying of these particular fibers of an acrylonitrile polymerization product by the particular method herein described. In the absence of such a pretreatment of the wet, gelled fiber with a composition comprising an anti-static agent, it is extremely difficult, if not impossible, to successfully dry advancing helices of a wet fiber of an acrylonitrile polymerization product due to the charge of static electricity which the fiber accumulates (apparently mainly as a result of friction as the fiber passes over the surface of the roll), thereby causing spreading of the filaments in each helix so that successive helices may overlap and cause damage to the filaments. Furthermore, when the dry thread is delivered from the drying rolls, the "ballooning" of the filaments caused by the accumulated static charge may cause mechanical damage to the thread when passing over the relaxation godet 76.

The rolls 70 and 72 may be made of any suitable material such, for example, as Monel metal, stainless steel, aluminum, chromium-plated copper, chromium-plated steel, anodized aluminum, dense graphite, fused quartz, glass, resin-impregnated glass-fiber laminate, etc. The rolls are preferably made of a material which is a good heat conductor, that is, a material which will permit the rapid transfer of heat from the interior surfaces to the external surfaces of the roll. The rolls may be made of one base material, which then may be plated or otherwise covered with a smooth layer of another material, e. g., a chrome plating.

Instead of applying the anti-static finish as described above, this finish may be applied to the wet gelled fiber in the manner described in Cresswell's aforementioned copending application Serial No. 68,370 with particular reference to Figs. 3 and 4 of the drawing accompanying that application and in the manner there illustrated. Thus, the spun and stretched fiber may be treated with a treating composition comprising an anti-static agent by continuously passing it through a trough through which is circulated an anti-static treating composition, which may be of the kind mentioned hereinbefore. This trough may be of the kind shown in Figs. 1 and 3, but it will be understood, of course, that any suitable vessel or container, which will hold or through which can be circulated the anti-static treating composition and through which the fiber can be continuously passed as hereinbefore described in contact with the said composition, may be employed. The anti-static treating composition which is circulated through such a trough may be at any suitable temperature, e. g., within the range of about 40° C. to about 70° C. Circulation of the anti-static composition through the trough is effected in the same manner as has previously been described with reference to the circulation of water through the stretch bath or trough 42. After being treated with the liquid finishing composition containing the anti-static agent, the treated, stretched fiber in gel state is then continuously dried by passing the fiber over drying rolls such as the rolls 70 and 72.

Alternatively, instead of using separate baths for stretching the fiber and for treating it with a composition comprising an anti-static agent, both operations may be effected by continuously passing the gelled fiber 26 through a combination stretch and anti-static treating bath. During its passage through this bath the gelled fiber is stretched between godets while the fiber is in contact with a liquid medium comprising water and, also, is simultaneously treated with an anti-static agent (numerous examples of which have been given hereinbefore), since such an agent likewise is a component of the liquid medium. The temperature of the liquid medium constituting the combined stretch and anti-static treating bath may be considerably varied, but is usually within the range of about 70° C. to about 100° C. The stretched gel, which has been treated with an anti-static agent conjointly with stretching to orient its molecules along the fiber axis, is then continuously dried under tension, for instance by causing advancing helices of the gelled fiber to pass under tension over drying rolls such as the rolls 70 and 72. Such a method of operation is illustrated in Fig. 4 of the drawing accompanying Cresswell's copending application Serial No. 68,370 and also is readable upon Fig. 3 of the drawing of the present application when the aqueous medium in the stretch trough is a liquid medium comprising water and, also, an anti-static agent. When such a procedure is followed, it is not necessary to apply an anti-static finish to the gelled fiber advancing in a helical path along the drying rolls 70 and 72.

The stretching of the fiber or yarn can be effected with or without an anti-static agent as a component of the stretch bath, but in either case it is preferably effected while the fiber is in a line which is tangent to two rotating circular surfaces and between which there is no other point of solid frictional contact, the peripheral speed of one of the said rotating surfaces being greater than that of the other thereby to maintain the gelled fiber under tension. Other means by which this can be done are shown in Figs. 4, 5 and 6 of the drawing of Cresswell's aforementioned copending application 73,078 and are fully described in the specification of that application with reference to these figures.

Referring again to Fig. 2 of the drawing of the present application, the fiber or thread is continuously led from the delivery end of the drying rolls through a suitable opening, such as the slot 80, in the heat-treating furnace 82 over a relaxation godet 76, thence to a pigtail thread guide 84 and finally to a suitable twister bobbin such, for example, as the ring twister 86.

The godet 76 is caused to revolve at a peripheral speed less than that of the rolls 70 and 72; in other words, the surface speed of godet 76 is such that the ratio of the speeds of godet 76 and of the drying rolls 70, 72 is proportional to the desired relaxation which is to be applied to the dried fiber 88 as it passes through the slot 80 in the furnace 82. The heat-treated fiber 90 is prevented from slipping as it passes over the godet 76 by means of the pinch roll 92 mounted in the roll support 94 located at the forward end of the arm 96, which is pivotally mounted at its other end upon the shaft 98 carried by the support 100. On the arm 96 is slidably mounted a weight 102 which can be held in position at any point on the arm by tightening the screw 104. By adjusting the position of the weight 102 on the arm 96, the pressure or pinch applied to the heat-treated fiber 90 as it passes between the pinch roll 92 and the godet 76 can be varied as desired or as conditions may require.

The heat-treating furnace 82 is constructed so that the temperature of the heating zone formed by the slot 80 will be at a temperature within the range of 100° C. to 500° C. at least in that portion thereof in the path of the running thread as it passes through the slot in a relaxed, free-to-contract state. For example, the furnace 82 can be formed from a solid metallic block 106, such as a block of stainless steel, and which is provided with the slot 80 along one surface thereof. The block is further provided with bores, two of which are shown at 108 in Fig. 4. In these bores are positioned electrical resistance heating units 110 provided with lead-in wires 112. Suitable openings such as the openings 114 provide means for introducing an instrument to facilitate the removal, when necessary, of the heating units 110 from the bores 108. The number and kind of heating units employed and their position in the block 106 are such that the air temperature in the path of the running fiber or thread will be within the aforementioned range, more particularly from about 175° C. to about 400° C., e. g. from 200° or 250° C. to 350° or 375° C. During its passage through the slot 80 the relaxed thread is heated both by radiation and convection to approximately the same temperature as that of the air (or other inert medium that may be present or can be introduced) in the path of travel of the running thread.

It is not essential that the furnace 82 be positioned above the drying rolls 70 and 72 as shown in Fig. 2. For instance, the furnace 82 can be located directly below the drying rolls or at an angle thereto, in which case the position of the relaxation godet also is changed.

We have observed that the fiber or thread passing through the furnace 82 is sufficiently relaxed when the dried thread 88 shows noticeable fluttering before entering the heat-treating furnace. In other words, the thread is sufficiently relaxed when the peripheral speed of the godet 76 is so much lower than the peripheral speed of the rolls 70 and 72 that the dried thread flutters slightly before entering the heat-treating furnace.

From the relaxation godet 76 the heat-treated fiber or thread 90 is continuosuly led under tension to the pigtail thread guide 84 and finally to a suitable twister bobbin such, for example, as the ring twister 86 whereby the twisted, heat-treated fiber 116 is collected on the bobbin 118. Instead of the ring twister shown in each of Figs. 2 and 3, any other suitable type of twister, e. g., a cap twister, or other fiber take-up device adapted to collect the fiber continuously, preferably under tension, can be employed.

If desired, the spinning, stretching, drying and heat-treating operations can be, and preferably are, carried out continuously, for instance as shown by way of illustration in Fig. 3. Corresponding parts have been numbered the same in Fig. 3 as in Figs. 1, 2 and 4.

Referring to Fig. 3, the spinning solution is forced under pressure through the openings in the spinneret 14, whereupon it coagulates or precipitates in the form of solid, water-swollen or gelled filaments or fiber 26 upon entering the coagulating bath 22, which is maintained at a temperature not exceeding substantially +10° C. by any suitable means, this phase of the operation being essentially the same as previously has been described with reference to Fig. 1.

The coagulated fiber in gel state is led through the bath 22, which preferably is of the circulating type, by any suitable means. In the embodiment of the invention shown in Fig. 3, the water-swollen or gelled fiber 26 is led downwardly to a submerged roller 120, which may be positively driven, and thence to the surface. This roller may be conveniently mounted on a removable bracket for ease in changing rollers.

Upon emerging from the coagulating bath 22 the fiber 26 passes over a guide collar 122 and thence to a pair of converging hollow drums or rolls 124 and 126. These rolls are positively driven by a suitable driving mechanism (not shown) and are suitably spaced from each other, e. g., 6 or 8 inches or more. They are suspended in the same vertical plane and are caused to rotate at the same peripheral speed. The rolls are slightly inclined (i. e., converge) toward each other at the delivery end, thereby to advance the thread over the rolls. The degree of convergency may be varied as desired or as conditions may require in order to advance the thread in a plurality of helices over the rolls. Either one or both rolls may converge slightly toward each other. With rolls 4 inches in diameter and 10 inches long, satisfactory results ordinarily are obtained by having the lower roll convergent to the upper roll, at the delivery end, by an angle of about 0.6°. The diameter and length of the rolls may be varied as desired or as conditions may require, but ordinarily they are such that, during operation, the length of thread being washed with cold liquid treating agent comprising water while the said thread is continuously moving in a helical path is from about 5 yards to about 40 yards.

If desired, both rolls may be tilted at a suitable angle to the horizontal, e. g., at an angle of about 2° to 10°, more particularly at an angle of about 5°, to the horizontal. By tilting the rolls at a substantial angle to the horizontal, the thread advancing along the rolls from the feed-on end to the take-off end meets a countercurrent stream of the cold liquid treating agent comprising mainly water, e. g., water itself, at a temperature not higher than +10° C. and preferably at a temperature within the range of about 0° C. to +5° C. This cold liquid treating agent is applied to the advancing helices of thread or fiber from the jet 128.

To prevent the ice water or other cold liquid coagulant comprising water from warming up excessively as it runs along the surfaces of the rolls, a suitable refrigerant advantageously may be introduced into either one or both of the hollow cylinders or rolls 124 and 126, thereby to maintain the exterior surface of the roll in contact with the thread at a temperature not higher than +10° C., more particularly within the range of about —15° C. to about 0° or +5° C. This refrigerant may be, for example, chilled brine, which can be circulated through either one or both rolls through a rotary joint, the brine entering the roll through one conduit and being discharged through another one. The wash water or other liquid treating agent comprising mainly water which is applied to the advancing helices of fiber in this manner drips off the rolls into a collector tray or basin 130 which is positioned immediately below the rolls, and from which the liquid flows into a return line 132 and thence, for example, back to coagulating bath 22 (after being refrigerated if necessary) or to a suitable recovery system.

As has been mentioned hereinbefore, the application of cold water to advancing helices of the gelled fiber facilitates the removal of traces of any water-soluble impurities which may be present in the gelled structure or on the exterior surface of the fiber. For example, when the solvent used in dissolving the acrylonitrile polymerization product is a highly hydrated metallic salt such as calcium thiocyanate, there may be a gradual increase in the concentration of this salt in the liquid coagulating bath 22. At the beginning of a spinning operation there may not be such a high concentration of salt in the spinning bath but as spinning proceeds this concentration increases unless fresh liquid coagulant, e. g., fresh cold water, is added to the bath in order to prevent a substantial increase in concentration of the salt. In cases where the concentration of the salt in the bath has increased materially, there naturally will be a small amount of such salt in or on the fiber as it emerges from the bath. By using treating rolls such as shown in Fig. 3 and applying cold water or other cold liquid treating agent comprising water to advancing helices of the fiber, such traces of salt are removed from the fiber prior to the stretching operation. This is advantageous in that it permits optimum stretching of the gelled fiber with a resulting marked improvement in the properties of the gelled product.

The rolls 124 and 126 may be constructed of the same materials as the drying rolls 70 and 72.

In some cases, however, it may not be necessary or desirable to use treating rolls such as illustrated in Fig. 3. In such instances the gelled fiber may be led through the bath 22 merely with the aid of a guide roll or sheave to facilitate the passage of the fiber through the coagulating bath as is shown in Fig. 1 of the drawing accompanying Cresswell's aforementioned copending application Serial No. 772,200. Or, the gelled fiber may be led through the bath 22 with the aid of a submerged, power-driven godet and multi-groove roll as is shown in Fig. 1 of the present application. The latter arrangement permits a long bath travel by multiple winds of synthetic fiber without excessive tension on the fiber, such as may occur when a pair of multi-groove rolls alone is used in leading the fiber through the bath.

With further reference to Fig. 3 the washed, gelled thread or fiber 134 is led from the discharge end of the converging rolls 124, 126 to a godet 38 which has the same surface speed as that of the said converging rolls. The fiber then passes through the hot aqueous liquid medium 40 contained in the stretch trough 42, and thence over the godet 44 about which the fiber is wrapped one or more (e g., 2 or 3) times. If desired, the peripheral speed of the godet 38 may be slightly greater than that of the converging rolls 124 and 126. The washed, aquagel fiber 134 is stretched in the hot aqueous medium 40 in the same manner as has been described hereinbefore with reference to the stretching of the fiber 26 (Fig. 1).

From the godet 44 the stretched, gelled fiber 46 is led to the drying rolls 70 and 72 on which the fiber is dried, under tension, as it advances in a helical path over the surfaces of the converging, heated rolls from the feed-on end to the delivery or take-off end. These rolls may be constructed, heated and operated in the same manner as has been described hereinbefore with reference to rolls 70 and 72 of Fig. 2. If desired, the rolls 70 and 72 shown in Fig. 3 may be tilted, as there shown, at a suitable angle to the horizontal, e. g., at an angle of from about 2° to about 10°, more particularly about 5°, to the horizontal.

The rolls 70 and 72 (Fig. 3) are caused to rotate at the same peripheral speed, or at a slightly higher speed, than the godet 44 so that the fiber or thread is under tension as it advances along the drying rolls.

At the feed-on end of either or both rolls 70 and 72 (Fig. 3), a finishing composition containing an anti-static agent is applied, as by means of a suitable jet, to the first few helices of fiber advancing along the rolls. In Fig. 3 the anti-static finish is shown by way of illustration as being applied by means of jet 136 upon the upper of the two drying rolls. The jet is preferably so positioned that the anti-static composition is applied directly to the first few helices of the fiber or thread advancing along the rolls. Since the rolls are tilted at an angle to the horizontal, the anti-static finish flows along the upper roll countercurrent to the advancing thread, thereby providing effective contact between the finish and the thread. After contacting the advancing fiber, the liquid anti-static composition drips or flows into the collector tray or basin 138 provided with a suitable conduit or drain 140 for withdrawing the excess finishing composition.

Instead of applying the anti-static finish in the manner illustrated in Fig. 3, this finish can be applied to the wet, gelled fiber in the manner described in Cresswell's aforementioned copending application Serial No. 68,370 with particular reference to Figs. 3 and 4 of the drawing accompanying that application and in the manner there illustrated.

From the delivery end of the drying rolls 70 and 72 the dried fiber or yarn 88 is led, while relaxed and free to contract linearly, through the heat-treating furnace 82, thence over the relaxation godet 76, which is caused to rotate at a peripheral speed less than that of the drying rolls 70 and 72. From the relaxation godet 76 the heat-treated fiber or thread 90 is continuously led under tension to the pigtail thread guide 84 and finally to a suitable twister bobbin such, for example, as the ring twister 86 whereby the twisted, heat-treated fiber 116 is collected on the bobbin 118. The apparatus and methods used in heat-treating the dried thread 88 and in continuously collecting (with or without twisting) the heat-treated thread 90 are the same as have been described more fully hereinbefore with reference to Fig. 2.

It will be understood, of course, by those skilled in the art that, in practicing the present invention, the solution of the polymeric or copolymeric acrylonitrile in the chosen solvent should be of such a concentration that a composition having a workable viscosity is obtained. The concentration of the polymerization product will depend, for example, upon the particular solvent and extrusion apparatus employed, the diameter of the fiber to be spun and the average molecular weight of the polymerization product, which usually is within the range of 15,000 to 300,000, as calculated from viscosity measurements using the Staudinger equation. Good results are obtained when the molecular weight (average molecular weight) is of the order of 35,000–50,000 to 140,000 or 150,000. The concentration of polymer or copolymer may range, for example, from 7 or 8% up to 18 or 20% by weight of the solution. The viscosity of the solution, as determined by measuring the time in seconds for a Monel metal ball $\frac{1}{8}$ inch in diameter to fall through 20 cm. of the solution at 61° C., is generally within the range of, for instance, from 10 to 500 seconds. It has been found that the best spinning solutions from the standpoint of coagulation and optimum properties of the precipitated gel are those which contain the highest concentration of polymer and the lowest concentration of zinc chloride, sodium or calcium thiocyanate, guanidine thiocyanate or other salt of the kinds aforementioned, which concentrations are consistent with solubility and viscosity limitations. A concentration of 7–10% polymeric or copolymeric acrylonitrile in 48–60% sodium or calcium thiocyanate solution has been found to give very satisfactory results. The viscosity of the solution should not be so high that it is difficult to filter or to stir and de-aerate prior to use.

As has been pointed out hereinbefore and in Cresswell's aforementioned copending applications Serial Nos. 772,200 and 68,370, the temperature of the aqueous coagulating bath is critical in the formation of a useful, workable, polymeric or copolymeric acrylonitrile fiber. When the polymerization product is coagulated in water at a temperature substantially above +10% C., e. g., at 20° or 25° C. or higher, an opaque, weak, nonductile structure results. This structure becomes increasingly weak and less transparent the higher the temperature of coagulation above about +10° C. However, by coagulating in a liquid coagulant comprising water at or below +10° C., e. g., in water at +1 to +5° C., or in an alcohol-water mixture at lower temperatures, e. g., at 0° to −10° C., the coagulated product is clear or substantially clear, cohesive, tough, ductile and capable of being oriented in its water-swollen or gel state. Generally speaking, the clearer the gelled or coagulated material, the greater its ductility.

In order that those skilled in the art better may understand how the present invention can be carried into effect, the following examples are given by way of illustration and not by way of limitation. All parts and percentages are by weight.

*Example 1*

A mixture of 111 parts of acrylonitrile and 1300 parts of water was heated with stirring to about 40° C. To the resulting solution was added 1.04 parts of sodium sulfate (flocculating agent for the polymer) dissolved in 11.4 parts of water. This was followed by the addition of 1 part of sodium metabisulfite (activator) dissolved in 11.4 parts of water and, immediately thereafter, 1 part of ammonium persulfate (catalyst) also dissolved in 11.4 parts of water. The polymerization reaction was allowed to proceed for two hours after the addition of the catalyst while maintaining the temperature at 40° C. The resulting slurry was filtered to separate the polyacrylonitrile, which was washed with about 2600 parts of water, dried for about 20 hours at 70° C. and then for 2 hours at 100° C. The dry polyacrylonitrile "crumb" was ball-milled to a fine powder. It had an average molecular weight of about 120,000 as calculated by means of the Staudinger equation from the viscosity of a solution of the polyacrylonitrile in dimethyl formamide.

A spinning solution was prepared from this polymer as follows: To 13.25 parts of 52.5% aqueous calcium thiocyanate solution was added 1 part of the finely divided polyacrylonitrile with rapid stirring. The mixture was slowly stirred for 24 hours at 45° C., filtered and then de-aerated prior to spinning. The viscosity of the solution, as determined by measuring the time for a Monel metal ball, $\frac{1}{8}$ inch in diameter and weighing 0.142 gram, to fall through 20 centimeters of the solution maintained at 61° C., was about 131 seconds.

The above solution was spun into a fiber by continuously extruding it through a 40-hole spinneret with holes of 110 microns diameter into a coagulating bath consisting of water cooled to 0°–1° C. The solution was heated inside the spinneret prior to extrusion to about 75°–80° C. by means of a steam-heated "finger." The coagulated fiber was carried back and forth through the bath at 3.52 meters per minute by means of a power-driven, submerged godet positioned at one end of the bath and a set of free-running rollers at the other end. The total bath travel of the gelled fiber or thread was about 144 inches.

The spun fiber was led out of the coagulating bath over several guide rollers and a driven godet A through a 12-inch trough containing water heated to 98°–99.5° C. The fiber was stretched in this bath about 55% by leading it over a second driven godet B, the peripheral speed of which was greater than that of the godet A, and thence over a roller onto a take-up bobbin. The stretch trough was designed as has been described hereinbefore with reference to Figs. 1 and 3. The fiber was stretched in this trough in a line which was tangent to two rotating circular surfaces, more particularly godets A and B, and between which there was no other point of solid, frictional contact. The take-up bobbin was provided with a traverse motion and was continuously sprayed with water to retain the fiber in the gel state. When sufficient thread had been spun the bobbin was removed and submerged in water in order to maintain the gel structure of the thread and, also, to remove any residual calcium thiocyanate that may have been present in the gelled thread.

The bobbin of wet gelled yarn was then suspended in a trough containing an aqueous dispersion of 1.5% of an anti-static agent, specifically the guanidinium salt of N-octadecylsulfosuccinamate. The dispersion was maintained at 45°–50° C.

Yarn from the immersed bobbin and which had been treated with the aqueous dispersion of the aforementioned anti-static agent was continuously led over a drying unit consisting of two, positively driven, stainless steel rolls, each of which was 4 inches in diameter and 10 inches long, and which were suspended in the same vertical plane 8 inches apart and were slightly inclined toward each other at the delivery ends thereby to advance the thread over the rolls. Each roll was electrically heated internally so as to provide an external surface temperature of about 74°–80° C., and was rotated at a peripheral speed of 20.6 meters per minute for the first tests and at 59 meters per minute for the second tests. The wet gelled yarn was helically wound around both rolls to form 42 loops or helices, each having an average circumference of about 0.724 meter. The yarn was dried as it advanced in a helical path over the rolls and while being maintained under tension. The yarn dried satisfactorily without accumulation of an electrostatic charge, and with no damage to the dried fibers or any operating difficulties during drying.

The dried yarn, which has a denier of approximately 175, was continuously led from the delivery end of the drying rolls through a heated zone or furnace similar to that shown in Figs. 2, 3 and 4 to a godet positioned outside the exit end of the furnace and bearing a weighted pinch roll. This godet was driven at a speed less than the speed of the drying rolls so that the yarn or thread was in a fully relaxed condition (and, therefore, was free to contract linearly) during its continuous passage through the hot zone of air in the furnace. In one run the air temperature of the furnace, that is, the temperature of the air in the path of the thread, was about 176.6° C. (about 350° F.) while in the other it was about 343.3° C. (about 650° F.). In both runs the peripheral speed of the drying rolls was 20.60 meters per minute while the peripheral speed of the "relaxation" godet was 18.85 meters per minute at the lower temperature and 18.70 meters per minute at the higher temperature. The percentage retraction was calculated from the difference between the yarn speed in meters/minute as it passed over the drying rolls and its speed, also in meters/minute, as it passed over the relaxation godet. From the length of the heating zone of the furnace, which was 15.3 cms., and the speed at which the yarn was being passed therethrough, the time in seconds that a given point on the running yarn was in the furnace was calculated. The data on the heat treatment of the dried fiber or yarn are given in Table I.

TABLE I

| Approx. Furnace Temp. in °C. (Note 1) | Speed of Running Fiber over Drying Rolls in Meters per Minute (Note 2) | Speed of Running Fiber over "Relaxation" Godet in Meters per Minute (Note 3) | "Let-Off" in Meters per Minute (Note 4) | Per Cent Retraction | Time of Heat Treatment in Seconds |
|---|---|---|---|---|---|
| 176.6 | 20.6 | 18.85 | 1.75 | 8.50 | 0.487 |
| 343.3 | 20.6 | 18.70 | 1.90 | 9.22 | 0.492 |

NOTES:
1. Temperature of the air in the path of the running fiber.
2. Corresponds to peripheral speed of drying rolls.
3. Corresponds to peripheral speed of relaxation godet.
4. Difference between speed of running fiber over drying rolls and speed over "relaxation" godet.

Before the heat treatment of the dried yarn in relaxed, free-to-shrink condition as above described, it had a shrinkage value of 13.0% after immersion for 10 minutes in boiling water in a loose state; and dry and wet elongations of 11.0 and 11.5%, respectively. Both of the heat-treated yarns, that is, the yarns which had been heated in the furnace at 176.6° C. and 343.3° C. had zero shrinkage when similarly tested in boiling water, and dry and wet elongations (both cases) of 15 and 16%, respectively.

The speed of the drying rolls was now increased so that the yarn was delivered to the furnace at 59.0 meters per minute. In one run the air temperature of the furnace was about 121.1° C. (about 250° F.) while in the other it was about 232.2° C. (about 450° F.). In both runs the peripheral speed of the drying rolls was 59.0 meters per minute while the speed of the relaxation godet was 57.5 meters per minute at the lower temperature and 53.2 meters per minute at the higher temperature. The data on the heat treatment of the dried fiber or yarn are given in Table II.

TABLE II

| Approx. Furnace Temp. in °C. (See Note 1, Table I) | Speed of Running Fiber over Drying Rolls in Meters per Minute (See Note 2, Table I) | Speed of Running Fiber over Relaxation Godet in Meters per Minute (See Note 3, Table I) | "Let-Off" in Meters per Minute (See Note 4, Table I) | Per Cent Retraction | Time of Heat Treatment in Seconds |
|---|---|---|---|---|---|
| 121.1 | 59.0 | 57.5 | 1.5 | 2.56 | 0.159 |
| 232.2 | 59.0 | 53.2 | 5.8 | 9.84 | 0.172 |

Before the heat treatment of the dried yarn in relaxed, free-to-shrink state as above described, it had a shrinkage value of 13% after 10 minutes' immersion in boiling water, and dry and wet elongations of 13.5% and 12.5%, respectively. The heat-treated yarns showed the following values for dry and wet elongations:

|  | Temperature of Treatment | |
|---|---|---|
|  | 121.1° C. | 232.2° C. |
|  | Per cent | Per cent |
| Dry elongation | 20 | 19 |
| Wet elongation | 22 | 18 |

The total breaking loads in grams, using a Scott inclined plane tensile tester, of the dry yarns before and after the described heat treatments, were as follows:

| | Total Breaking Load in Grams |
|---|---|
| Before heat treatment | 540 |
| After heat treatment at 121.1° C. | 550 |
| After heat treatment at 232.2° C. | 500 |

The yarn which had been heat-treated at 232.2° C. showed zero shrinkage after 10 minutes' immersion in boiling water.

In all of the above runs the heat-treated yarn was led directly from the relaxation godet to a ring twister for the insertion of approximately 8.5 turns per inch Z twist in the case of the runs wherein the peripheral speed of the drying rolls was 20.6 meters per minute; and an insertion of approximately 3 turns per inch Z twist in those runs wherein the peripheral speed of the drying rolls was 59.0 meters per minute. The yarn was under tension after being led from the relaxation godet and as it was continuously collected on a take-up spool or bobbin.

Example 2

A mixture was prepared containing 100 parts of acrylonitrile, 11.1 parts of acrylamide and 1560 parts of water. The temperature was raised to 40° C. and then 1 part of ammonium persulfate in 6.95 parts of water was added, followed immediately by the addition of 1 part of sodium metabisulfite also dissolved in 6.95 parts of water. The copolymerization reaction was allowed to proceed for two hours after the addition of catalyst and activator while maintaining the temperature of the reaction mass at 40° C. The resulting slurry was filtered to separate the copolymer of acrylonitrile and acrylamide, which then was washed with about 3000 parts of water and dried at about 65.5° C. for 24 hours. The dry copolymer was then ground to a fine powder. It had an average molecular weight of about 85,000 as determined by the method described under Example 1.

One part of the finely divided copolymer was added with rapid stirring to 13.25 parts of 52.5% aqueous calcium thiocyanate solution. The mixture was slowly stirred for 24 hours at 45° C., filtered and then de-aerated prior to spinning. The ball-fall viscosity of the resulting spinning solution was 61.1 seconds as determined by the method described under Example 1.

The above solution was spun into a fiber and stretched to orient the molecules along the fiber axis in essentially the same manner described under Example 1 with the exception that the coagulated fiber was carried back and forth through the bath at 2.43 meters per minute, and the gelled fiber was stretched approximately 800% in the aqueous stretch bath maintained at 98°–99.5° C.

Instead of collecting the gelled, stretched fiber on a bobbin as in Example 1, it was continuously led from the stretch bath through a trough containing an aqueous dispersion of 2% of the guanidinium salt of N-octadecylsulfosuccinamate (anti-static agent), which dispersion was maintained at 45°–50° C. From the anti-static bath, the treated, gelled fiber or yarn was led directly to heated, converging drying rolls of the kind described under Example 1. Each roll was electrically heated internally so as to provide an external surface temperature of about 74°–80° C., and was caused to rotate at a peripheral speed of 19.65 meters per minute. The yarn was dried under tension while it advanced in a helical path over these rolls, as described more fully under Example 1.

The dried yarn, which had a denier of approximately 225, was continuously led from the delivery end of the drying rolls through a heated zone or furnace at varying temperatures and while relaxed and free to shrink or contract linearly in the same general manner described under Example 1. In all four runs which were made, the peripheral speed of the drying rolls was 19.65 meters per minute while the speed of the relaxation godet was 17.45 meters per minute at the lowest furnace temperature employed (about 176.6° C.) and 17.10 meters per minute at the three higher furnace temperatures used. The data on the operating conditions are given in Table III.

TABLE III

| Approx. Furnace Temp. in °C. (See Note 1, Table I) | Speed of Running Fiber over Drying Rolls in Meters per Minute (See Note 2, Table I) | Speed of Running Fiber over Relaxation Godet in Meters per Minute (See Note 3, Table I) | "Let-Off" in Meters per Minute (See Note 4, Table I) | Per Cent Retraction | Time of Heat Treatment in Seconds |
|---|---|---|---|---|---|
| 176.6 | 19.65 | 17.45 | 2.20 | 11.20 | 0.525 |
| 204.4 | 19.65 | 17.10 | 2.55 | 12.99 | 0.538 |
| 232.2 | 19.65 | 17.10 | 2.55 | 12.99 | 0.538 |
| 287.7 | 19.65 | 17.10 | 2.55 | 12.99 | 0.538 |

In all of the above runs the heat-treated yarn was led directly from the relaxation godet, while under tension, to a ring twister for the insertion of approximately 8.5 turns per inch Z twist.

Before the above-described heat treatments the dried fiber or yarn had a shrinkage (linear shrinkage) of 20.6% after immersion for 10 minutes in boiling water; and both dry and wet elongations of 12.5%. The shrinkage values and the dry and wet elongations of the heat-treated fibers, when tested in the same manner, were as follows:

| Temp. of Treatment in °C. | Per Cent Shrinkage | Per Cent Dry Elongation | Per Cent Wet Elongation |
|---|---|---|---|
| 176.6 | 12.4 | 24.0 | 27.0 |
| 204.4 | 11.1 | 24.0 | 27.0 |
| 232.2 | 12.4 | 21.5 | 25.0 |
| 287.7 | 7.1 | 22.5 | 24.5 |

The total breaking loads in grams, using a Scott inclined plane tensile tester, of the dry and wet fibers before and after the described heat treatments are shown below:

|  | Total Breaking Load in Grams | |
|---|---|---|
|  | Dry | Wet |
| Before heat treatment | 650 | 590 |
| After heat treatment at 176.6° C | 690 | 620 |
| After heat treatment at 204.4° C | 640 | 560 |
| After heat treatment at 232.2° C | 670 | 620 |
| After heat treatment at 287.7° C | 670 | 610 |

*Example 3*

A copolymer of acrylonitrile and methyl acrylate was prepared by mixing 95 parts of acrylonitrile and 5 parts of methyl acrylate with 1170 parts of water and raising the temperature to 40° C. Then 1.2 parts of sodium sulfate (flocculant for the copolymer) dissolved in 8.9 parts of water was added, followed immediately by the addition of 1 part of ammonium persulfate (polymerization catalyst) dissolved in 8.9 parts of water and 1 part of sodium metabisulfite (activator for the catalyst) also dissolved in 8.9 parts of water. The copolymerization reaction was allowed to proceed for 4 hours after the addition of the catalyst and activator while maintaining the temperature at 40° C. The resulting slurry was filtered to separate the copolymer of acrylonitrile and methyl acrylate, which was then washed with water until free from sulfate ion, and dried in an air-circulating oven for about 24 hours at 65° C. The dry copolymer was ball-milled to a fine powder. The copolymer had an average molecular weight of about 110,500 as determined by the method described under Example 1. One gram of the dry copolymer, dissolved in a 60% aqueous sodium thiocyanate solution to make 100 ml. at 20° C., had a viscosity at 40° C. of 31.6 centipoises.

A spinning solution was prepared by first mixing 12 parts of a 57.3% aqueous solution of calcium thiocyanate with 1.25 parts of water, and adjusting the pH of the resulting solution to 6.8. One part of the powdered acrylonitrile-methyl acrylate copolymer was thoroughly mixed into the aqueous calcium thiocyanate solution while maintaining the temperature of the latter at −10° C. Mixing was continued for 24 hours while keeping the solution under an atmosphere of carbon dioxide and at a temperature of +45° C. The resulting calcium thiocyanate solution of the copolymer was filtered and de-aerated prior to spinning. The ball-fall viscosity of this spinning solution was 98.0 seconds as determined by the method described under Example 1.

The above solution was spun into a fiber by continuously extruding it through a 40-hole spinneret with holes of 90 microns diameter into a coagulating bath of water cooled to about +1° C. The solution was heated inside the spinneret prior to extrusion to about 70°–80° C. by means of a steam-heated "finger." The other conditions of spinning and stretching were essentially the same as described under Example 1 with the exception that the gelled fiber was stretched approximately 900% in the hot aqueous stretch bath, the temperature of which was about 99°–99.8° C. The stretched fiber was collected on a take-up bobbin in the same manner as in Example 1, and thereafter was stored under water until further processed.

In the subsequent steps of the process, the bobbin of wet gelled fiber or yarn was suspended in a trough containing an aqueous dispersion of an anti-static finishing composition, more particularly such a composition containing 1% by weight thereof of guanylurea octadecyl hydrogen sulfate and 1% of butyl stearate. The dispersion was maintained at 45°–50° C.

From the bath of anti-static finishing composition the treated yarn was continuously led to drying rolls where it was continuously dried, while under tension, in the same general manner as described under Examples 1 and 2. The rolls were rotated at a peripheral speed of 34 meters per minute, and were internally heated so as to provide an external surface temperature of about 74°–80° C.

The dried yarn, which had a denier of approximately 150, was continuously led from the delivery end of the drying rolls through a heat-treating furnace in the same general manner set forth in the preceding examples. The air temperature of the furnace in the path of the running yarn or thread was about 343.3° C. (about 650° F.) The peripheral speed of the relaxation godet was 29.9 meters per minute, so that the yarn was relaxed and free to shrink or contract linearly during the passage through the furnace. The "let-off" in meters per minute was 4.1, and the percent retraction was about 12.1. The time that any point on the running fiber was heat treated in relaxed state at the aforementioned temperature was 0.307 second. The heat-treated yarn was led directly from the relaxation godet, while under tension, to a ring twister for the insertion of approximately 5 turns per inch S twist.

Before the heat treatment of the yarn in relaxed state it had a dry elongation of 12% and a shrinkage of 9% after immersion for 10 minutes in boiling water. The heat-treated yarn showed zero shrinkage after 10 minutes' immersion in boiling water, while its dry elongation was 18.5%.

*Example 4*

A copolymer of acrylonitrile and ethyl acrylate was prepared by mixing 95 parts of acrylonitrile and 5 parts of ethyl acrylate with 1170 parts of water and raising the temperature to 40° C. Then 0.94 part of sodium sulfate dissolved in 7.7 parts of water was added, followed immediately by the addition of 1.25 parts of ammonium persulfate dissolved in 7.7 parts of water and 1.25 parts of sodium metabisulfite also dissolved in 7.7 parts of water. The copolymerization reaction was allowed to proceed for 2 hours after the addition of the catalyst and activator while maintaining the temperature at 40° C. The resulting slurry was filtered to separate the copolymer of acrylonitrile and ethyl acrylate, which was then washed with water until free from sulfate ion, and dried in an air-circulating oven at 70° C. for 24 hours. The dry copolymer was ball-milled to a fine powder. The copolymer had an average molecular weight of about 107,000 as determined by the method described under Example 1. One gram of the dry copolymer, dissolved in a 60% aqueous sodium thiocyanate solution to make 100 ml. at 20° C., had a viscosity at 40° C. of 30.7 centipoises.

A spinning solution was prepared from the finely divided copolymer as described under Example 3 with the exception that the aqueous solution of calcium thiocyanate in which the copolymer was dissolved was adjusted to a pH of 6.5. The ball-fall viscosity of the resulting spinning solution was 86.3 seconds as determined by the method described under Example 1.

The filtered and de-aerated solution was spun into a fiber by continuously extruding it through a 40-hole spinneret with holes of 110 microns diameter into a cold (+1° C.) coagulating bath of water and thereafter was stretched in a bath of hot water to orient the molecules along the fiber axis. The spinning and stretching conditions were the same as described in the preceding example with the exception that the gelled fiber was stretched approximately 700% in the hot aqueous stretch bath.

Instead of collecting the gelled, stretched fiber on a bobbin as in Examples 1 and 3, it was continuously led from the stretch bath through a trough containing an aqueous dispersion of 2% of the guanidinium salt of N-octadecylsulfo-succinamate (anti-static agent), which dispersion was maintained at 45°–50° C. From the anti-static bath, the treated, gelled fiber or yarn was led directly to heated, converging drying rolls as in the preceding examples. The rolls were rotated at a peripheral speed of 20.0 meters per minute.

The dried yarn, which had a denier of approximately 200, was continuously led from the delivery end of the drying rolls through a heat-treating furnace in the same general manner set forth in the preceding examples. The air temperature of the furnace in the path of the running yarn ranged between about 246.1° C. (about 475° F.) and about 273.9° C. (about 525° F.). The peripheral speed of the relaxation godet was 17.6 meters per minute, so that the yarn was relaxed and free to contract linearly during its passage through the furnace. The "let-off" in meters per minute was 2.4, and the per cent retraction was about 12.0. The time that any point on the running fiber was heat treated in relaxed state within the aforementioned temperature range was 0.521 second. The heat-treated yarn was led directly from the relaxation godet, while under tension, to a ring twister for the insertion of approximately 8.5 turns per inch Z twist.

Before the heat treatment of the yarn in relaxed state it had a dry elongation of 9% and a shrinkage of 12.5% after immersion for 10 minutes in boiling water. The heat-treated yarn showed zero shrinkage after 10 minutes' immersion in boiling water, while its dry elongation was 20.0%.

It will be understood, of course, by those skilled in the art that our invention is not limited to the specific polymerization products and solutions thereof, the specific conditions of spinning, the specific method of treating or washing advancing helices of the gelled fiber, the specific method of stretching the gelled fiber, the specific anti-static agents nor to the specific conditions of anti-static treatment, continuous drying and continuous heat treatment of the dried fiber in relaxed state, as given by way of illustration in the above examples and shown by way of example in the accompanying drawings. Thus, instead of the particular copolymers employed in certain of the examples, we can use 100% polymeric acrylonitrile or other copolymers containing in the molecules thereof an average of at least 85% by weight of combined acrylonitrile. Numerous examples of comonomers that can be copolymerized with acrylonitrile in forming such copolymers have been given hereinbefore.

Likewise, it will be understood by those skilled in the art that the present invention is not limited to the specific anti-static agents nor to the specific finishing compositions containing such an agent that are given in the above illustrative examples, since any other anti-static agent or composition containing the same, numerous examples of which have been given hereinbefore, and which is adapted to obviate or retard materially the accumulation of static electricity during the continuous drying of the helices of the wet, gelled fiber as hereinbefore described, may be employed.

The anti-static agent can be applied to the gelled fiber prior to drying by any suitable means, but preferably it is applied in the form of a liquid dispersion, more particularly an aqueous dispersion. This dispersion may contain any suitable amount of anti-static agent, but ordinarily such an agent is present in the dispersion in an amount corresponding to from about 0.5% to about 5% by weight thereof. The dispersion can be applied, for example, by immersing the fiber in the dispersion, or by spraying or otherwise contacting the fiber with the dispersion. In applying the dispersion, it is preferably heated to an elevated temperature, e. g., from about 45° or 50° C. to about 95° C., or in some cases even as high as 100° C. With some anti-static agents the dispersion containing the same may be applied at room temperature (20°–30° C.) or at temperatures up to 45° C., but such temperatures may be less desirable with other anti-static agents because of the greater difficulty in maintaining the anti-static agent homogeneously dispersed in water or other volatile liquid dispersion medium at the lower temperatures. Upon continuously drying the treated, gelled fiber under tension and subsequently heat-treating the dried fiber in relaxed state as hereinbefore described, the resulting fiber has the anti-static agent deposited at least on the outer surfaces thereof. The amount of anti-static agent which is present in or on the dried and heat-treated fiber may vary considerably, but ordinarily it is present therein or thereon in an amount, by weight, corresponding to from about 0.2% to about 4% of the dried, untreated fiber.

The liquid composition containing the anti-static agent can be applied to the wet, gelled fiber at any suitable stage during its production and prior to continuous drying of the same as hereinbefore described. As previously has been mentioned, it can be applied during the stretching of the wet spun fiber to orient the molecules thereof; or it can be applied between any of the guides or godets or other rolls employed in the spinning process and which precede the continuous drying of the wet fiber. In some cases the gelled fiber may be spun on a bobbin or as a pot cake, dyed, treated with an anti-static agent, and the wet, dyed fiber in gel state thereafter may be continuously dried and then further heat-treated, while relaxed, as previously has been described with particular reference to an undyed, gelled fiber.

If desired, the finishing composition containing the anti-static agent which is deposited in or on the dried and after-heat-treated fiber may be allowed to remain in place during and after the production of the article in its ultimate form, especially in those cases wherein the fiber or fabric or other textile or article made from the same is not later to be dyed. If the fiber (or fabric or other textile or article produced from the fiber) is to be dyed, then the finishing composition containing the anti-static agent is usually removed therefrom prior to dyeing, for example by means of the usual aqueous scouring baths.

The present invention provides an effective and economical method of improving the physical properties, especially elongation and resistance to shrinkage, of a synthetic fiber produced from an acrylonitrile polymerization product containing in the molecules thereof an average of at least about 85% by weight of combined acrylonitrile. The method is especially suitable for commercial operations, and can be carried out in apparatus which is relatively simple and inexpensive. Surprisingly, too, the shrinkage and elongation characteristics of the fiber are improved without any appreciable (if any) discoloration of the fiber and without adversely affecting other useful properties of the fiber, e. g., moth-resistance, mildew-resistance, resistance to weathering, organic solvents and other chemical agents, etc.

The term "fiber" as used generically herein and in the appended claims is intended to include within its meaning both monofilaments and multifilaments.

In our copending, divisional application Serial No. 212,929, filed February 27, 1951, we have claimed apparatus features described herein and illustrated in the accompanying drawing forming a part of this application.

We claim:

1. The method of producing a synthetic fiber from a soluble acrylonitrile polymerization product containing in the molecules thereof an average of at least about 85% by weight of combined acrylonitrile, said method comprising extruding the said product in the form of a fiber from a water-coagulable solution thereof; immediately after extrusion contacting the extruded mass with a liquid coagulant comprising water, said coagulant being at a temperature not exceeding +10° C., thereby to precipitate the said product from the said solution as a stretchable, gelled fiber; stretching the said gelled fiber in the presence of moisture and at a temperature within the range of about 70° C. to about 110° C.; applying a liquid composition containing an anti-static agent to the stretched gel; continuously drying the resulting gelled fiber while it is moving under tension in a helical path; continuously passing the dried fiber, while relaxed and free to contract linearly, through a heated zone maintained at a temperature within the range of 100° C. to 500° C. at a rate such that the time at which any given point on the said fiber is within the said zone is from 0.01 to 5 seconds, the temperature of the said zone and the rate at which the dried, relaxed fiber is passed therethrough being such that no substantial decomposition of the fiber occurs.

2. The method of producing a synthetic fiber having improved physical properties from a soluble acrylonitrile polymerization product containing in the molecules thereof an average of at least about 85% by weight of combined acrylonitrile, said method comprising continuously extruding the said product in the form of a fiber from a water-coagulable solution thereof; immediately after extrusion immersing the continuously moving, extruded fiber in a liquid coagulant comprising mainly water, said coagulant being at a temperature within the range of —15° C. to +10° C., thereby to obtain a gelled, stretchable fiber; continuously stretching the said gelled fiber in the presence of moisture, at a temperature within the range of about 70° C. to about 100° C. and while it is in a line which is tangent to two rotating circular surfaces and between which there is no other point of solid frictional contact, the peripheral speed of one of the said rotating surfaces being greater than that of the other thereby to maintain the gelled fiber under tension; applying an aqueous dispersion containing an anti-static agent to the stretched fiber in gel state; continuously drying the resulting gelled fiber, while maintaining it under tension, by causing it move in a helical path in contact with a surface at least a portion of which is heated to a temperature sufficiently high to dry the said fiber; continuously passing the dried fiber, while relaxed and free to contract linearly, through a heated zone maintained at a temperature within the range of 100° C. to 500° C. at a rate such that the time at which any given point on the said fiber is within the said zone is within the range of from 0.01 to 5 seconds, the temperature of the said zone and the rate at which the dried, relaxed fiber is passed therethrough being such that no substantial decomposition of the fiber occurs.

3. A method of producing a synthetic fiber having improved elongation and resistance to shrinkage from a viscous, water-coagulable solution of an acrylonitrile polymerization product containing in the molecules thereof an average of at least about 85% by weight of combined acrylonitrile, said method comprising heating the said solution at a temperature sufficiently high to reduce its viscosity; continuously extruding the said solution, while thus being heated, in the form of a fiber; immediately after extrusion immersing the continuously moving, extruded fiber in a liquid coagulant comprising mainly water, said coagulant being at a temperature not higher than +5° C., thereby to obtain a gelled, stretchable fiber; continuously stretching the gelled fiber at least about 100% while passing through a bath comprising mainly water and maintained at a temperature within the range of about 70° C. to about 100° C.; contacting the stretched fiber in gel state with a liquid composition comprising an anti-static agent; continuously drying advancing helices of the resulting gelled fiber while maintaining the said helices under tension, at least a portion of each helix being in contact with a smooth, heated surface, the temperature of the said surface, the portion of each helix which is in contact therewith, the duration of said contact, and the number of helices in contact with the said heated surface being such that the said helices of gelled fiber are dried; continuously passing the dried fiber, while relaxed and free to contract linearly, through a heated zone maintained at a temperature within the range of about 175° C. to about 400° C. at a rate such that the time at which any given point on the said fiber is within the said zone is within the range from 0.01 to 1 second, the temperature of the said zone and the rate at which the dried, relaxed fiber is passed therethrough being such that no substantial decomposition of the fiber occurs; and continuouly collecting the resulting fiber.

4. A method of producing a shrink-resistant synthetic fiber having improved elongation from a water-coagulable solution of an acrylonitrile polymerization product containing in the molecules thereof an average of at least about 85% by weight of combined acrylonitrile, said polymerization product being dissolved in a concentrated aqueous solution of a water-soluble salt which yields highly hydrated ions in aqueous solution, and said method comprising continuously spinning the said water-coagulable solution into a spinning bath maintained at a temperature not exceeding +10° C. and comprising mainly water, whereby a spun, stretchable fiber in gelled state is obtained; applying to the said gelled fiber, while it is continuously moving in a helical path, a liquid treating agent comprising water, said treating agent being at a temperature not exceeding +10° C.; continuously stretching the treated gelled fiber at least about 100% while in contact with water at a temperature within the range of about 70° C. to about 100° C. and while it is in a line which is tangent to two rotating circular surfaces and between which there is no other point of solid frictional contact, the peripheral speed of one of the said rotating surfaces being greater than that of the other thereby to maintain the gelled fiber under a tension sufficient to stretch it at least about 100%; applying a liquid composition containing an anti-static agent to the continuously moving, stretched gel; continuously drying the resulting gelled fiber, while maintaining it under tension, by causing it to move in a helical path in contact with a surface at least a portion of which is heated to a temperature within the range of about 40° C. to about 200° C., the said gelled fiber being in contact with the said portion of the said heated surface for a period at least sufficient to dry it; relaxing the tension on the continuously moving, dried fiber so that it is free to contract linearly; continuously passing the dried fiber, while relaxed and free to contract linearly, through a heated zone maintained at a temperature within the range of about 175° C. to about 400° C. at a rate such that the time at which any given point on the said fiber is within the said zone is within the range of from 0.01 to 1 second, the temperature of the said zone and the rate at which the dried, relaxed fiber is passed therethrough being such that no substantial decomposition of the fiber occurs; and continuously collecting the resulting fiber.

5. A method as in claim 4 wherein the acrylonitrile polymerization product is dissolved in a concentrated aqueous solution of a water-soluble thiocyanate and the spinning bath is maintained at a temperature not higher than about +5° C.

6. A method as in claim 5 wherein the water-soluble thiocyanate is sodium thiocyanate.

7. The method of producing a synthetic fiber having increased resistance to shrinkage and increased elongation from an acrylonitrile polymerization product containing in the molecules thereof an average of at least about 85% by weight of combined acrylonitrile and having a molecular weight of about 35,000 to about 300,000 as calculated from viscosity measurements using the Staudinger equation, said method comprising dissolving the said acrylonitrile polymerization product in a concentrated aqueous solution of sodium thiocyanate; heating the said sodium thiocyanate solution of the said polymerization product at an elevated temperature sufficiently high to reduce its viscosity while continuously extruding the heated solution in the form of a fiber; immediately after extrusion immersing the continuously moving, extruded fiber in a coagulating bath comprising mainly water maintained at a temperature of about −10° C. to about +5° C., whereby a spun stretchable fiber in gel state is obtained; applying to the said stretchable fiber, while it is continuously moving in a helical path, a liquid treating agent comprising water, said treating agent being at a temperature not exceeding +10° C., thereby to remove from the said fiber any of the said sodium thiocyanate which may still be present therein or thereon; continuously stretching the gelled fiber at least about 200% while passing through water maintained at a temperature of about 90° C. to about 100° C.; applying an aqueous dispersion containing an anti-static agent to continuously advancing helices of the stretched fiber; continuously drying, while being maintained under tension, advancing helices of the resulting gelled fiber, at least a portion of each helix being in contact with a smooth, rotating, heated surface, the temperature of the said surface, the portion of each helix which is in contact therewith, the duration of said contact, and the number of helices in contact with the said heated surface being such that the said helices of gelled fiber are dried; relaxing the tension on the continuously moving, dried fiber so that it is free to contract linearly; continuously passing the dried fiber, while relaxed and free to contract linearly, through a heated zone maintained at a temperature within the range of about 100° C. to about 500° C. at a rate such that the time at which any given point on the said fiber is within the said zone is within the range of from 0.01 to 5 seconds, the temperature of the said zone and the rate at which the dried, relaxed fiber is passed therethrough being such that no substantial decomposition of the fiber occurs; and continuously collecting the resulting fiber.

8. A continuous method of producing a shrink-resistant synthetic fiber having increased elongation from an acrylonitrile polymerization product, said method comprising spinning a water-coagulable solution of an acrylonitrile product containing in the molecules thereof an average of at least about 85% by weight of combined acrylonitrile, said polymerization product having an average molecular weight within the range of about 50,000 to about 150,000 as calculated from viscosity measurements using the Staudinger equation and being dissolved in a concentrated aqueous solution of a water-soluble thiocyanate, and said solution being spun into a spinning bath maintained at a temperature not higher than about +5° C. and comprising mainly water, whereby a spun, stretchable fiber in gel state is obtained; applying to the said gelled fiber, while it is continuously moving in a helical path in contact with a smooth rotating surface, water at a temperature of from about 0° C. to not higher than +10° C., thereby to remove from the said gelled fiber any of the said thiocyanate which may still be present therein or thereon; continuously stretching the treated gelled fiber at least about 200% while passing through water maintained at a temperature within the range of about 90° C. to about 100° C. and while it is in a line which is tangent to two rotating circular surfaces and between which there is no other point of solid frictional contact, the peripheral speed of one of the said rotating surfaces being greater than that of the other thereby to maintain the gelled fiber under tension; applying an aqueous dispersion containing an anti-static agent to continuously advancing helices of the stretched, gelled fibers; continuously drying the resulting gelled fiber, while maintaining it under tension, by causing it to move in a helical path in contact with a rotating surface, at least a portion of which is heated to a temperature within the range of about 50° C. to about 120° C., the said gelled fiber being in contact with the said portion of the said heated surface for a period at least sufficient to dry the fiber;

continuously passing the dried fiber, while relaxed and free to contract linearly, through a heated zone maintained at a temperature within the range of about 175° C. to about 400° C. at a rate such that the time at which any given point on the said fiber is within the said zone is within the range of from 0.01 to 1 second, the temperature of the said zone and the rate at which the dried fiber is passed therethrough being such that no substantial decomposition of the fiber occurs; and continuously collecting the resulting fiber.

9. A method as in claim 8 wherein the water-soluble thiocyanate is calcium thiocyanate, the acrylonitrile polymerization product constitutes from about 7% to about 20% by weight of the calcium thiocyanate solution in which it is dissolved, and the water-coagulable solution of the acrylonitrile polymerization product has a viscosity within the range of from about 10 seconds to about 500 seconds, as determined by measuring the time in seconds for a Monel metal ball having a diameter of $1/8$ inch to fall through 20 cm. of the solution at 61° C.

ARTHUR CRESSWELL.
IRVIN WIZON.

REFERENCES CITED

The following references are of record in the file of this patent:

UNITED STATES PATENTS

| Number | Name | Date |
|---|---|---|
| 2,325,060 | Ingersol | July 27, 1943 |
| 2,404,714 | Latham | July 23, 1946 |
| 2,445,042 | Silverman | July 13, 1948 |